(12) United States Patent
Shetty et al.

(10) Patent No.: US 12,331,837 B2
(45) Date of Patent: Jun. 17, 2025

(54) ADDITIVE MANUFACTURING AND GENERATIVE DESIGN HYDRAULIC SHUTTLE VALVE

(71) Applicant: The Boeing Company, Chicago, IL (US)

(72) Inventors: Kishora Shetty, Bengaluru (IN); Chandan Radhakrishna Chittal, Bengaluru (IN)

(73) Assignee: The Boeing Company, Arlington, VA (US)

( * ) Notice: Subject to any disclaimer, the term of this patent is extended or adjusted under 35 U.S.C. 154(b) by 268 days.

(21) Appl. No.: 17/556,996

(22) Filed: Dec. 20, 2021

(65) Prior Publication Data

US 2022/0299122 A1    Sep. 22, 2022

Related U.S. Application Data

(60) Provisional application No. 63/163,648, filed on Mar. 19, 2021.

(51) Int. Cl.
*F16K 11/044*    (2006.01)
*B64C 25/44*    (2006.01)
(Continued)

(52) U.S. Cl.
CPC .......... *F16K 11/044* (2013.01); *B64C 25/44* (2013.01); *F16K 27/0263* (2013.01); *F16K 31/122* (2013.01)

(58) Field of Classification Search
CPC ....... B64C 25/42; B64C 25/44; F15B 13/028; F16K 11/044; F16K 11/07
See application file for complete search history.

(56) References Cited

U.S. PATENT DOCUMENTS 10,344,890 B2    7/2019    Merrill
11,662,031 B2 *  5/2023    Martin ...................... F16K 1/42
                                                                137/625.48
(Continued)

OTHER PUBLICATIONS

Diegel, Olaf and Wohlers, Terry. Design for Additive Manufacturing: Increasing part value through intelligent optimisation. Metal Am Magazine. vol. 3 No. 3 Autumn 2017. pp. 103-107. (Year: 2017).*

(Continued)

*Primary Examiner* — Jacob J Cigna
(74) *Attorney, Agent, or Firm* — Alleman Hall & Tuttle LLP

(57) ABSTRACT

A shuttle valve including a first inlet having a first, substantially uniform fluid line and a second inlet having a second, substantially uniform fluid line. A manifold chamber is in communication with the first and second fluid lines, and an outlet having a third fluid line between the first and second inlets. The third fluid line has a third inner radius substantially uniform along a third length of the third fluid line. A spool is disposed in the manifold chamber. A retention feature is disposed in the manifold chamber and configured to retain the spool at one of a first position and a second position. At the first position the spool blocks the first inlet; at the second position the spool blocks the second inlet, but the outlet remains open. The first inlet, the second inlet, the outlet, and the manifold chamber are integrally formed as a monocoque body.

8 Claims, 7 Drawing Sheets

(51) Int. Cl.
    *F16K 27/02* (2006.01)
    *F16K 31/122* (2006.01)

(56) References Cited

U.S. PATENT DOCUMENTS 11,788,633 B1 * 10/2023 Martin ................ F16K 11/0716
                                                  137/625.48
2016/0290368 A1 * 10/2016 Collins ............... F16K 31/0675

OTHER PUBLICATIONS

Geating, J. T., et al., "Design, Fabrication, and Qualification of a 3D printed Metal Quadruped Body: Combination Hydraulic Manifold, Structure and Mechanical Interface", Solid Freeform Fabrication 2017: Proceedings of the 28th Annual International Solid Freeform Fabrication Symposium, Jan. 1, 2017, 20 pages.

* cited by examiner

ADDITIVE MANUFACTURING AND GENERATIVE DESIGN HYDRAULIC SHUTTLE VALVE

RELATED APPLICATIONS

This application claim priority to U.S. provisional patent application 63/163,648, filed Mar. 19, 2021, the entirety of which is hereby incorporated by reference.

BACKGROUND

A shuttle valve is a hydraulic system component which has two fluid inlets and one fluid outlet, but which allows fluid to flow only from one inlet to the outlet at a time. In other words, a shuttle valve either allows fluid to flow from a first inlet to the outlet, or to flow from the second inlet to the outlet, but not both concurrently. Depending on the relative fluid pressures in the two inlets, the shuttle valve may switch fluid in-flow between the first and second inlets.

SUMMARY

The one or more embodiments provide for a shuttle valve. The shuttle valve includes a first inlet having first coupling region in communication with a first fluid line. The first fluid line has a first inner radius that is substantially uniform along a first length of the first inlet. The shuttle valve also includes a second inlet having a second coupling region in communication with a second fluid line. The second fluid line has a second inner radius that is substantially uniform along a second length of the second inlet. The shuttle valve also includes a manifold chamber in communication with the first fluid line, opposite the first coupling region, and in communication with the second fluid line, opposite the second coupling region. The shuttle valve also includes an outlet having a third coupling region in communication with a third fluid line. The third fluid line is in communication with the manifold chamber between the first inlet and the second inlet. The third fluid line has a third inner radius that is substantially uniform along a third length of the third fluid line. The shuttle valve also includes a spool disposed in the manifold chamber. The shuttle valve also includes a retention feature disposed in the manifold chamber and configured to retain the spool at one of a first position and a second position. At the first position a first end of the spool blocks the first inlet. At the second position a second end of the spool blocks the second inlet. At either the first position or the second position the outlet remains open. The first inlet, the second inlet, the outlet, and the manifold chamber are integrally formed as a monocoque body.

The one or more embodiments also provide for a method of manufacturing. The method includes forming an integrally formed monocoque body using an additive manufacturing process. The integrally formed monocoque body also includes a first inlet having first coupling region in communication with a first fluid line. The first fluid line has a first inner radius that is substantially uniform along a first length of the first inlet. The integrally formed monocoque body also includes a second inlet having a second coupling region in communication with a second fluid line. The second fluid line has a second inner radius that is substantially uniform along a second length of the second inlet. The integrally formed monocoque body also includes a manifold chamber in communication with the first fluid line, opposite the first coupling region, and in communication with the second fluid line, opposite the second coupling region. The integrally formed monocoque body also includes an outlet having a third coupling region in communication with a third fluid line. The third fluid line is in communication with the manifold chamber between the first inlet and the second inlet. The third fluid line has a third inner radius that is substantially uniform along a third length of the third fluid line. The method also includes inserting a spool in the manifold chamber. The method also includes inserting a retention feature in the manifold chamber, the retention feature configured to retain the spool at one of a first position and a second position. At the first position a first end of the spool blocks the first inlet. At the second position a second end of the spool blocks the second inlet. At either the first position or the second position the outlet remains open.

The one or more embodiments also provide for an aircraft. The aircraft includes a fuselage and a landing gear system connected to the fuselage. The aircraft may include a hydraulic braking system connected to the landing gear system. The hydraulic braking system may include a shuttle valve. The shuttle valve includes a first inlet having first coupling region in communication with a first fluid line. The first fluid line has a first inner radius that is substantially uniform along a first length of the first inlet. The shuttle valve also includes a second inlet having a second coupling region in communication with a second fluid line. The second fluid line has a second inner radius that is substantially uniform along a second length of the second inlet. The shuttle valve also includes a manifold chamber in communication with the first fluid line, opposite the first coupling region, and in communication with the second fluid line, opposite the second coupling region. The shuttle valve also includes an outlet having a third coupling region in communication with a third fluid line. The third fluid line is in communication with the manifold chamber between the first inlet and the second inlet. The third fluid line has a third inner radius that is substantially uniform along a third length of the third fluid line. The shuttle valve also includes a spool disposed in the manifold chamber. The shuttle valve also includes a retention feature disposed in the manifold chamber and configured to retain the spool at one of a first position and a second position. At the first position a first end of the spool blocks the first inlet. At the second position a second end of the spool blocks the second inlet. At either the first position or the second position the outlet remains open. The first inlet, the second inlet, the outlet, and the manifold chamber are integrally formed as a monocoque body.

Other aspects of the invention will be apparent from the following description and the appended claims.

DETAILED DESCRIPTION

Figure 1:
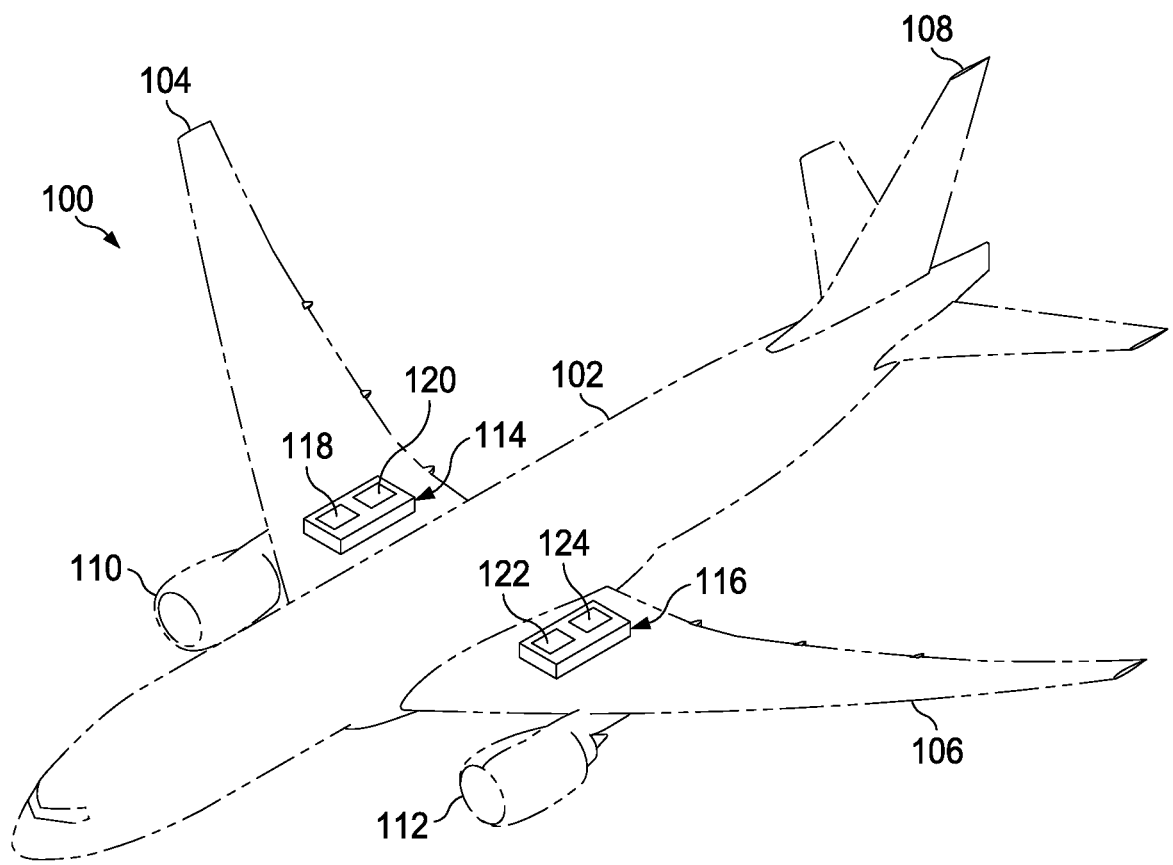
FIG. 1 shows an aircraft in which the shuttle valve of the one or more embodiments may be placed, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "substantially," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "substantially congruent" if the values of the two angles are within ten percent of each other. However, if an engineer determines that the engineering tolerance for a particular product should be tighter, then "substantially congruent" could be two angles having values that are within one percent of each other. Likewise, engineering tolerances could be loosened in other embodiments, such that "substantially congruent" angles have values within twenty percent of each other. In any case, the ordinary artisan is capable of assessing what is an acceptable engineering tolerance for a particular product, and thus is capable of assessing how to determine the variance of measurement contemplated by the term "substantially."

As used herein, the term "connected to" contemplates at least two meanings. In a first meaning, unless otherwise stated, "connected to" means that component A was, at least at some point, separate from component B, but then was later joined to component B in either a fixed or removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

In general, embodiments of the invention relate to a shuttle valve having a monocoque body that eliminates many seals and other parts that are required in prior art shuttle valves. The shuttle valve of the one or more embodiments combines the end-fittings with the housing manifold, which eliminates leakage paths and reduces the component part count, relative to prior art shuttle valves, from 7 to 1. Instead, an integrated manifold housing is manufactured using additive manufacturing (sometimes referred-to as "three-dimensional printing." Using generative design methodologies, the overall housing manifold design is modified, and excess material is eliminated. Adapters are eliminated in favor of integrated adapters at the inlets and outlets, thereby again reducing part count and leakage paths.

Additionally, the integrated design reduces assembly time as well as overall manufacturing efforts and cost. Elimination of parts and leakage paths increases both the service life and the performance of the shuttle valve. Material waste is reduced, and the use of less material in manufacturing saves money relative to machining techniques.

Yet further, additive manufacturing uses machines that improve safety, relative to traditional subtractive mill and lathe operations that use specialized training of personnel to ensure high quality and safety of operations. The additive manufacturing process also reduces weight, particularly via generative design techniques and seal elimination. The shuttle valve of the one or more embodiments thus provides for a simplified assembly process and a reduced assembly time, while concurrently providing an improved design that performs better relative to prior shuttle valves.

FIG. 1 shows an aircraft in which the shuttle valve of the one or more embodiments may be placed, in accordance with one or more embodiments of the invention. The aircraft (100) includes a fuselage (102), a first wing (104), a second wing (106), and a tail (108). The aircraft (100) may also include a propulsion system, such as first engine (110) and second engine (112). The aircraft may also contain one or more hydraulic systems, such as first hydraulic braking system (114) and second hydraulic braking system (116). The hydraulic braking systems each may contain one or more shuttle valves. For example, the first hydraulic braking system (114) includes a first shuttle valve (118) and a second shuttle valve (120), and the second hydraulic braking system (116) includes a third shuttle valve (122) and a fourth shuttle valve (124). The aircraft (100) may include additional components, in addition to those described above. Note that the shuttle valves may be used in other hydraulic systems of the aircraft. Note also that shuttle valves generally, including those described herein, may be used in many different hydraulic systems in a wide variety of products other than aircraft.

Figure 2:
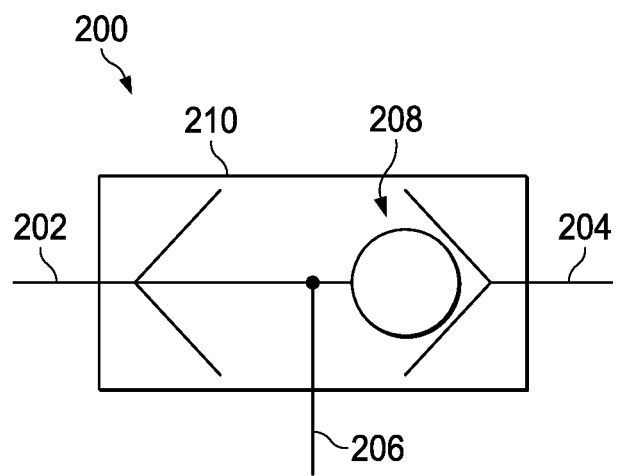
FIG. 2 shows a symbol of a shuttle valve, in accordance with one or more embodiments of the invention.

FIG. 2 shows a symbol of a shuttle valve, in accordance with one or more embodiments of the invention. The shuttle valve (200) may be any of the first shuttle valve (118), the second shuttle valve (120), the third shuttle valve (122) and the fourth shuttle valve (124) of FIG. 1. The shuttle valve (200) includes a first inlet (202), a second inlet (204), and an outlet (206). Fluid flows from either the first inlet (202), through a manifold chamber (210), and to the outlet (206); or, the fluid flows from the second inlet (204), through the manifold chamber (210), and to the outlet (206). However, fluid does not concurrently flow from both the first inlet (202) and the second inlet (204) concurrently. A shuttle assembly (208) within the shuttle valve (200) blocks one of the first inlet (202) or the second inlet (204), depending on the pressure in the two inlets.

When the pressure in one of the inlets exceeds a threshold pressure relative to the other inlet, then the shuttle assembly (208) is forced to the opposite inlet. In the example of FIG. 2, the pressure in the first inlet (202) is higher than the threshold pressure relative to the second inlet (204). Thus, the shuttle assembly (208) blocks the second inlet (204), allowing fluid to flow from the first inlet (202) to the outlet (206).

Figure 3:
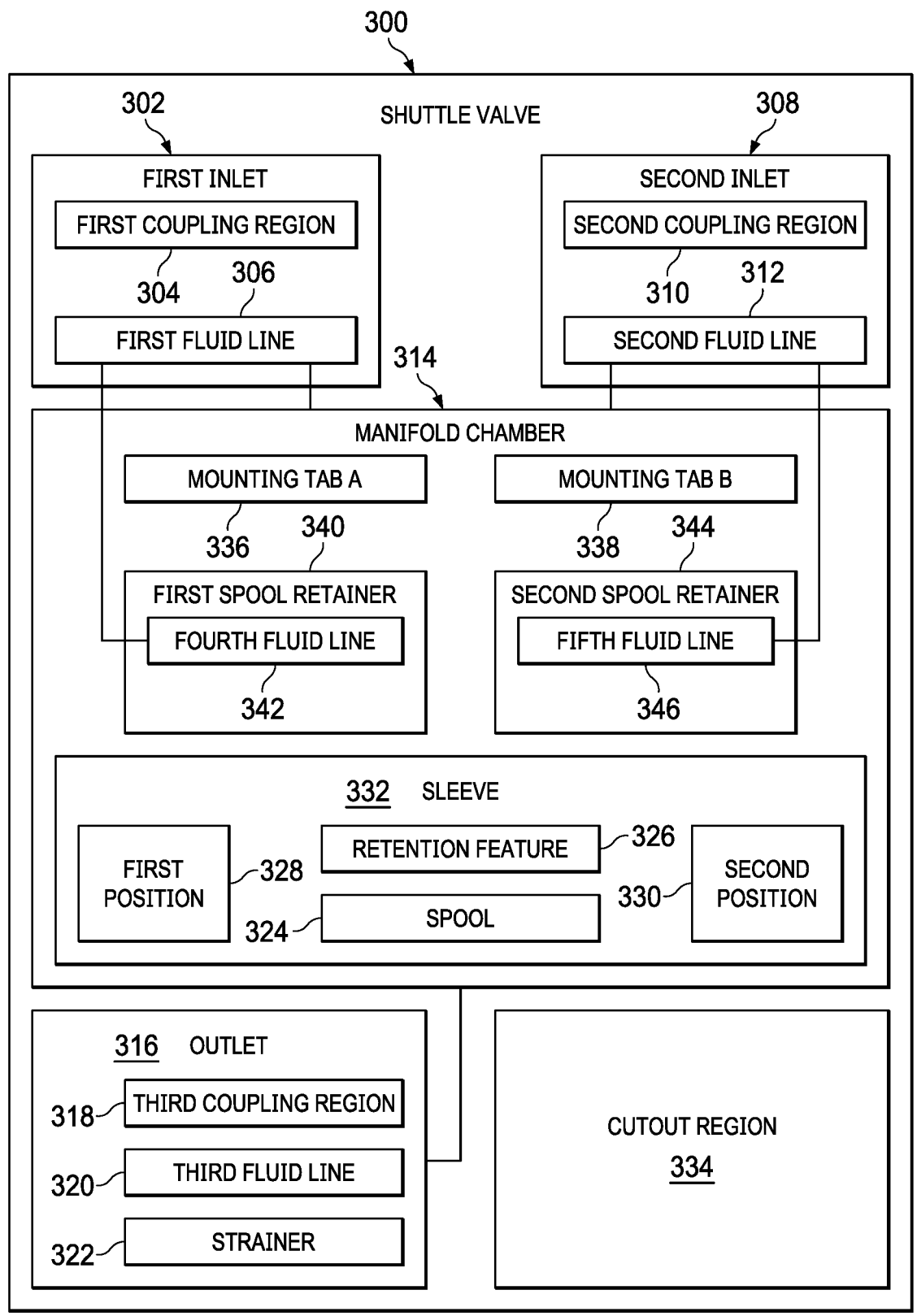
FIG. 3 shows a block diagram of a shuttle valve, in accordance with one or more embodiments of the invention.

FIG. 3 shows a block diagram of a shuttle valve, in accordance with one or more embodiments of the invention. The shuttle valve (300) shown in FIG. 3 may be used in the aircraft (100) shown in FIG. 1, and may be used for the shuttle valve (200) shown in FIG. 2.

The shuttle valve (300) includes a first inlet (302) having first coupling region (304) in communication with a first fluid line (306). A "coupling region," as used herein refers to a portion of an inlet or an outlet that is configured, sized, and dimensioned to couple with some other component in the hydraulic system. For example, a "coupling region" may be configured, as part of a monocoque body, to have a predetermined radius, fittings, detents, threads, etc., that are intentionally designed to connect a fluid line of the shuttle valve (300) to another fluid line in the hydraulic system, or to some other component of the hydraulic system. Thus, the term "coupling region" has a definitive structure, though the definitive structure for coupling, but the definitive structure may take a variety of different embodiments.

Additionally, the term "fluid line," as used herein, refers to a hollow pipe, of whatever cross-sectional shape, through which fluid flows. In the example of FIG. 3, the first fluid line (306) has a first inner radius that is substantially uniform along a first length of the first inlet (302). However, in other embodiments, the cross-section of the first inlet (302) may vary, or may contain other sub-components.

The shuttle valve (300) also includes a second inlet (308) having a second coupling region (310) in communication with a second fluid line (312). The second fluid line (312) has a second inner radius that is substantially uniform along a second length of the second inlet. However, again, the second coupling region (310) and the second fluid line (312) may vary, as defined and described above with respect to the first coupling region (304) and the first fluid line (306).

The shuttle valve (300) also includes a manifold chamber (314) in communication with the first fluid line (306), opposite the first coupling region (304), and in communication with the second fluid line (312), opposite the second coupling region (310). In other words, the manifold chamber (314) lies between the first inlet (302) and the second inlet (308), relative to the direction of fluid flow from either the first inlet (302) or the second inlet (308).

The shuttle valve (300) also includes an outlet (316) having a third coupling region (318) in communication with a third fluid line (320). The third fluid line (320) is in communication with the manifold chamber (314) between the first inlet (302) and the second inlet (308). The third fluid line (320) has a third inner radius that is substantially uniform along a third length of the third fluid line (320).

The shuttle valve (300) also includes a spool (324) disposed in the manifold chamber (314). The spool (324) is an object which may slide longitudinally within the manifold chamber (314) between the first inlet (302) and the second inlet (308). The spool (324) may be a cylindrical object, as shown, but may have different cross sectional shapes.

The shuttle valve (300) also includes a retention feature (326) disposed in the manifold chamber (314). The retention feature (326) is configured to retain the spool (324) at one of a first position (328) and a second position (330) within the manifold chamber (314). The retention feature (326) may be a spring, a deformable object, a deformable ring, a solid object or ring that presses against a deformable feature or into a groove in the manifold chamber (314) or in a sleeve (332) disposed in the manifold chamber (314), or other possible objects. In any case, the retention feature (326) urges the spool (324) to remain in place within the manifold chamber (314) until the fluid pressure differential between the first inlet (302) and the second inlet (308) exceeds a threshold fluid pressure.

At the first position (328), a first end of the spool (324) blocks the first inlet (302). At the second position (330), a second end of the spool (324) blocks the second inlet (308). At either the first position (328) or the second position (330) the outlet (316) remains open.

The spool (324) shifts back and forth between the first position (328) and the second position (330) depending on the fluid pressure differential between the first inlet (302) and the second inlet (308). When the differential fluid pressure between a fluid pressure at the first inlet (302), less a fluid pressure at the second inlet (308), exceeds a threshold fluid pressure, then the force exerted by the retention feature (326) is overcome. Accordingly, the spool (324) shifts from the first position (328) to the second position (330). Conversely, when the differential fluid pressure between a fluid pressure at the second inlet (308), less a fluid pressure at the first inlet (302), exceeds the threshold fluid pressure, then the force exerted by the retention feature (326) is again overcome. Accordingly, the spool (324) shifts from the second position (330) back to the first position (328).

In this manner, fluid may flow from one of the first inlet (302) or the second inlet (308), but not both concurrently during normal operation of the shuttle valve (300). Note that for brief periods of time, the spool (324) may be in an intermediate position between the first position (328) and the second position (330). At the intermediate position, it may be possible, depending on the design of the spool (324) and/or a sleeve (332) surrounding the spool (324), that fluid may flow briefly from both inlets concurrently. However, the time the spool (324) takes to shift from the first position (328) to the second position (330) is fast, typically less than a second. Thus, practically, the retention feature (326) will prevent the spool (324) from assuming an intermediate position for any longer length of time. Accordingly, practically for operational purposes, the spool (324) will be at either the first position (328) or the second position (330), but not in-between.

The first inlet (302), the second inlet (308), the outlet (316), and the manifold chamber (314) are integrally formed as a monocoque body. As used herein, the term "monocoque" means integrally formed as a single whole unit, as opposed to a device which is originally fashioned from separate parts that are then brought together and joined via some technique such as welding, gluing, bolting, screwing, taping, fitting, interlocking, etc. Thus, while the shuttle valve (300) may have a complex shape that has regions that are given names (e.g., the first inlet (302), the first coupling region (304), the first fluid line (306), the second inlet (308), the second coupling region (310), the second fluid line (312), the manifold chamber (314), the outlet (316), the third coupling region (318), the third fluid line (320), and a strainer (322)), all such regions are a single integral body having no seams, joints, etc. Note, however, that the spool (324) and the retention feature (326) are separate from the monocoque body of the shuttle valve (300), as the shuttle valve (300) moves within the manifold chamber (314).

The shuttle valve (300) described above may have additional variations or additional components added to the monocoque body. For example, a first cross-section of the first inlet (302), a second cross-section of the second inlet (308), and a third cross-section of the outlet (316) may be substantially uniform. All the three cross sections need not be equivalent; however, the individual cross sections may be uniform with minimal changes in the cross sectional areas. In this case, the outlet (316) may extend radially from the manifold chamber (314) a first distance. The third fluid line (320) then has a bend at the first distance before terminating at the third coupling region (318). Furthermore, the third fluid line (320) may bend such that a terminal region of the third fluid line (320) is substantially parallel to the second fluid line (312) of the second inlet (308).

In the above variation, a cutout region (334) may be disposed between the outlet (316) and the second inlet (308). Note that the term "cutout" in the cutout region (334) does not imply that milling or cutting has been performed on the shuttle valve (300). Instead, the term "cutout" only indicates that the monocoque body of the shuttle valve (300) has been formed such that "empty space" exists in the cutout region (334). For example, using additive manufacturing, the three-dimensional printer may be ordered to avoid depositing material in the cutout region (334), thereby forming the shuttle valve (300) with the cutout region (334).

Figure 5:
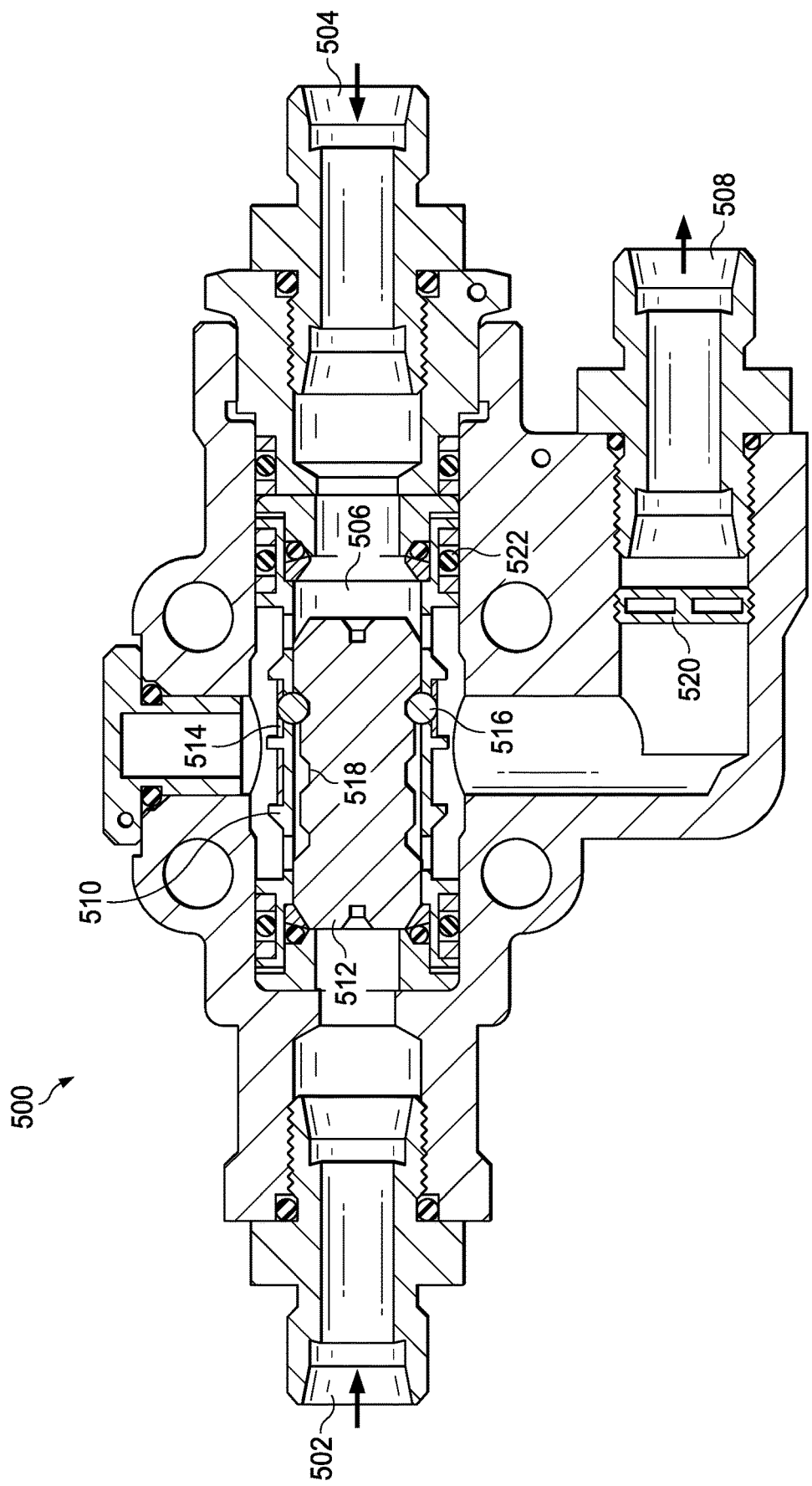
FIG. 5 shows a prior art shuttle valve.

The cutout region (334) may not be possible in a known shuttle valve, such as the prior art shuttle valve (500) shown in FIG. 5, due to strength engineering specifications. Additionally, even if the cutout region (334) could be cut out from the prior art shuttle valve (500) of FIG. 5, building the monocoque body of the shuttle valve (300) to have the cutout region (334) saves material, manufacturing time, and money, and decreases the weight of the shuttle valve (300), thereby increasing the efficiency of manufacturing the shuttle valve (300) without losing any of the engineering specifications for strength.

Still other variations are possible. For example, a strainer (322) may be integrally formed with the outlet in the third fluid line (320), possibly after the bend and possibly before the bend. The strainer (322) is likewise part of the monocoque body of the shuttle valve (300), and thus is formed as a solid region through which one or more holes are present in order to allow fluid to flow through the third fluid line (320) of the outlet (316).

The shuttle valve (300) may have still other variations. For example, one or more mounting tabs, such as mounting tab A (336) and mounting tab B (338), may be integrally formed on an outer side of the manifold chamber (314). The mounting tabs may aid in mounting the shuttle valve (300) to some other component in the hydraulic system, or to a support external to the hydraulic system.

The shuttle valve (300) may also include a first spool retainer (340) disposed at a first intersection between the first fluid line (306) and the manifold chamber (314). The first spool retainer (340) effectively retains the spool (324) at the first position (328), until differential fluid pressure forces the spool (324) to move, as described above. The first spool retainer (340) includes a fourth fluid line (342) in communication with the first fluid line (306) and having a fourth inner radius substantially equal to the first inner radius of the first fluid line (306).

Similarly, the shuttle valve (300) may also include a second spool retainer (344) disposed at a second intersection between the second fluid line (312) and the manifold chamber (314). The second spool retainer (344) effectively retains the spool (324) at the second position (330), until differential fluid pressure forces the spool (324) to move, as described above. The second spool retainer (344) includes a fifth fluid line (346) in communication with the second fluid line (312) and having a fifth inner radius substantially equal to the second inner radius of the second fluid line (312).

The shuttle valve (300) may also include a sleeve (332) that surrounds the spool (324). The sleeve (332) thus is disposed within the manifold chamber (314). The spool (324) slides longitudinally within the sleeve (332) between the first position (328) and the second position (330). The retention feature (326) may be disposed between the sleeve (332) and the spool (324). In this case, the manifold chamber (314) is completely enclosed, but for the first inlet (302), the second inlet (308), and the outlet (316), with the combination of the spool (324) and the sleeve (332) disposed within the manifold chamber (314). In still another embodiment, the sleeve (332) may be part of the monocoque body of the shuttle valve (300), but the spool (324) is added later by placing the spool (324) inside the sleeve (332).

Still other variations are possible. Thus, the one or more embodiments are not necessarily limited to the examples given above.

Figure 4:
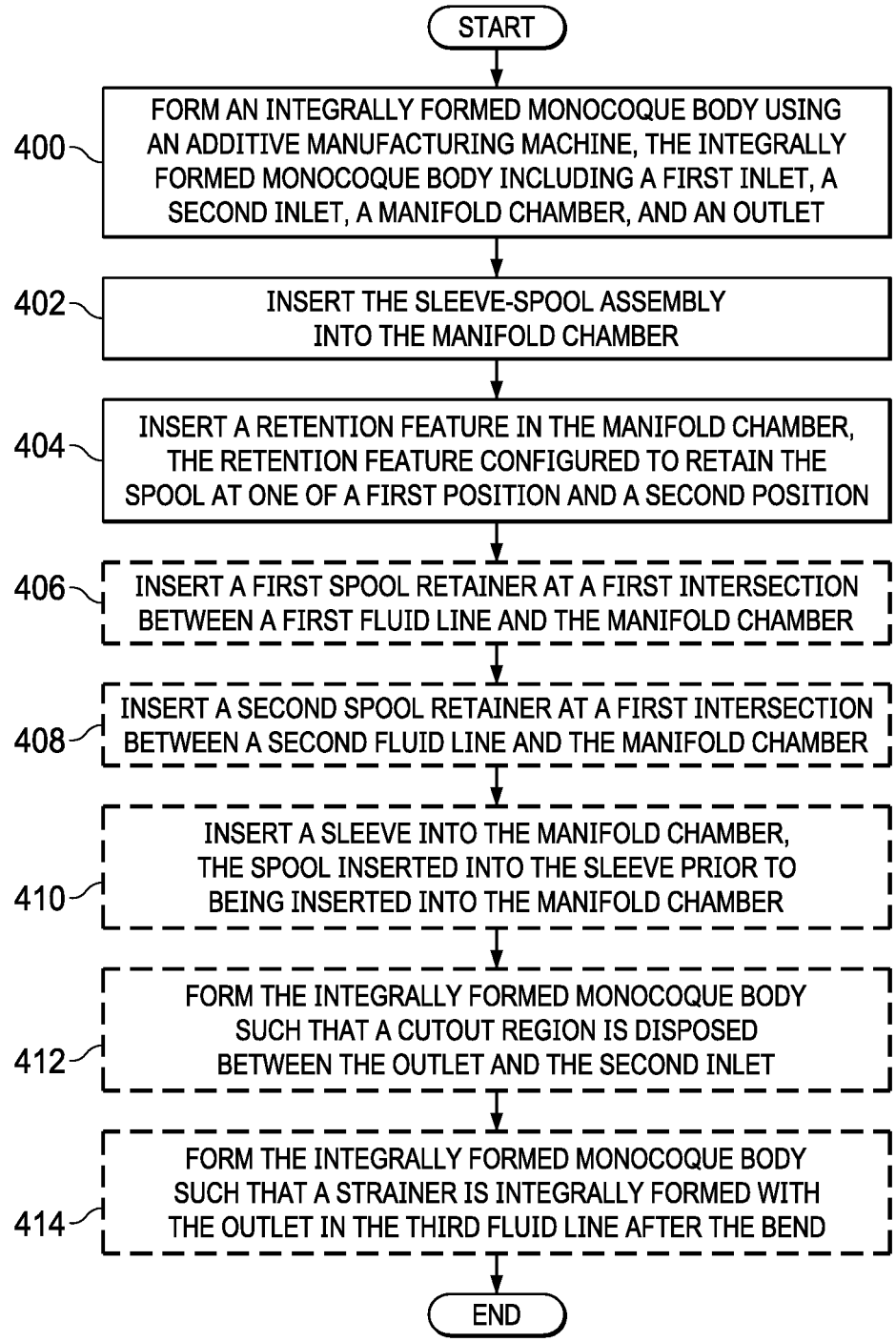
FIG. 4 shows a method of manufacturing, in accordance with one or more embodiments of the invention.

FIG. 4 shows a method of manufacturing, in accordance with one or more embodiments of the invention. The method of FIG. 4 may be used to manufacture the shuttle valve (300) of FIG. 3, and or the various embodiments shown with respect to FIG. 6 and FIG. 7.

At step 400, an integrally formed monocoque body is formed using an additive manufacturing process, wherein the integrally formed monocoque body includes: a first inlet having first coupling region in communication with a first fluid line, wherein the first fluid line includes a first inner radius that is substantially uniform along a first length of the first inlet; a second inlet having a second coupling region in communication with a second fluid line, wherein the second fluid line comprises a second inner radius that is substantially uniform along a second length of the second inlet; a manifold chamber in communication with the first fluid line, opposite the first coupling region, and in communication with the second fluid line, opposite the second coupling region; an outlet having a third coupling region in communication with a third fluid line, wherein the third fluid line is in communication with the manifold chamber between the first inlet and the second inlet, and wherein the third fluid line comprises a third inner radius that is substantially uniform along a third length of the third fluid line. Step 400 may be performed using an additive manufacturing process based on a generative design model that is provided as input into the additive manufacturing machine. For example, a design model may be provided to a three-dimensional printer, and the monocoque body may be "printed" in a printing chamber.

At step 402, the sleeve-spool assembly is inserted into the manifold chamber. The sleeve and the spool may have been formed separately prior to insertion into the manifold chamber. Optionally, the spool may be inserted inside a sleeve already formed with the manifold chamber. Alternatively, a spool is inserted in the manifold chamber, followed by the sleeve.

At step 404, a retention feature is inserted in the manifold chamber, the retention feature configured to retain the spool at one of a first position and a second position. At the first position a first end of the spool blocks the first inlet. At the second position a second end of the spool blocks the second inlet. At either the first position or the second position the outlet remains open. In one embodiment, the method of FIG. 4 may terminate thereafter.

The method of FIG. 4 may be varied, including for example the optional steps shown in dashed boxes in FIG. 4. For example, at step 406, possibly in place of the step 404, a first spool retainer may be inserted at a first intersection between the first fluid line and the manifold chamber. The first spool retainer includes a fourth fluid line in communication with the first fluid line and has a fourth inner radius substantially equal to the first inner radius. Similarly, at step 408, a second spool retainer may be inserted at a second intersection between the second fluid line and the manifold chamber. The second spool retainer includes a fifth fluid line in communication with the second fluid line and having a fifth inner radius substantially equal to the second inner radius.

As indicated above, at step 410, a sleeve may be inserted into the manifold chamber. The spool may be inserted into the sleeve prior to being inserted into the manifold chamber, or afterwards. The spool slides longitudinally within the sleeve between the first position and the second position.

In an embodiment, the integrally formed monocoque body is formed such that a first cross-section of the first inlet, a second cross section of the second inlet, and a third cross section of the outlet are manufactured to be substantially equivalent. Additionally, the integrally formed monocoque body may be formed such that: the outlet extends radially from the manifold chamber a first distance, and the third fluid line has a bend at the first distance before terminating at the third coupling region.

In this case, the integrally formed monocoque body may be formed such that the third fluid line bends such that a terminal region of the third fluid line is substantially parallel to the second fluid line of the second inlet. In this case, at step 412, the method may also include further forming the integrally formed monocoque body such that a cutout region is disposed between the outlet and the second inlet.

Optionally, at step 414, the method may include further forming the integrally formed monocoque body such that a strainer is integrally formed with the outlet in the third fluid line after the bend. Other features may also be integrally formed with the monocoque body.

While the various steps in this flowchart are presented and described sequentially, one of ordinary skill will appreciate that some or all of the steps may be executed in different orders, may be combined or omitted, and some or all of the steps may be executed in parallel. Thus, the one or more embodiments are not necessarily limited to the examples provided above.

FIG. 5 shows a prior art shuttle valve. The shuttle valve (500) includes a first inlet (502) and a second inlet (504) that allows fluid to flow into a manifold chamber (506). An outlet (508) allows fluid to flow out of the manifold chamber (506).

A sleeve (510) in the manifold chamber (506) retains a spool (512). The spool may slide back and forth between the first inlet (502) and the second inlet (504), depending on the changing fluid pressures in the two inlets. In a first position, shown in FIG. 5, the spool (512) blocks the first inlet (502). In a second position, not shown in FIG. 5, the spool (512) blocks the second inlet (502).

The spool (512) is urged to remain in either position due to a c-spring (514) which receives and pushes down on a retaining feature (516) in contact with the spool (512). The retaining feature (516) is disposed in a slot in the sleeve (510). When the fluid pressure from the first inlet (502) becomes higher than a threshold pressure difference relative to the fluid pressure from the second inlet (504), the retaining feature (516) is pushed against the side of the inset in which the spool (512) is located. The retaining feature (516) either deforms (is squeezed), or otherwise is forced to roll out of the inset. As a result, the spool (512) of the shuttle valve moves to a new position where another groove (518) in the spool (512) receives the retaining feature (516). Again, the c-spring (514) retains the retaining feature (516), but now in the second position.

However, the prior art shuttle valve (500) shown in FIG. 5 has a number of issues. The c-springs (514) can become worn and may allow the retaining feature (516) to break away and fall into the outlet (508). Thus, a strainer disk (520) is present to prevent the loose retaining feature (516) from moving into other parts of the hydraulic system. In the meantime, the shuttle valve (500) may operate outside of engineering tolerances, and thus may require maintenance and/or replacement, which may be costly procedures.

Another issue of the prior art shuttle valve (500) is that several seals, such as seals (522), are needed to ensure no fluid leaks. Each of the seals may be subject to costly maintenance procedures.

Figure 6:
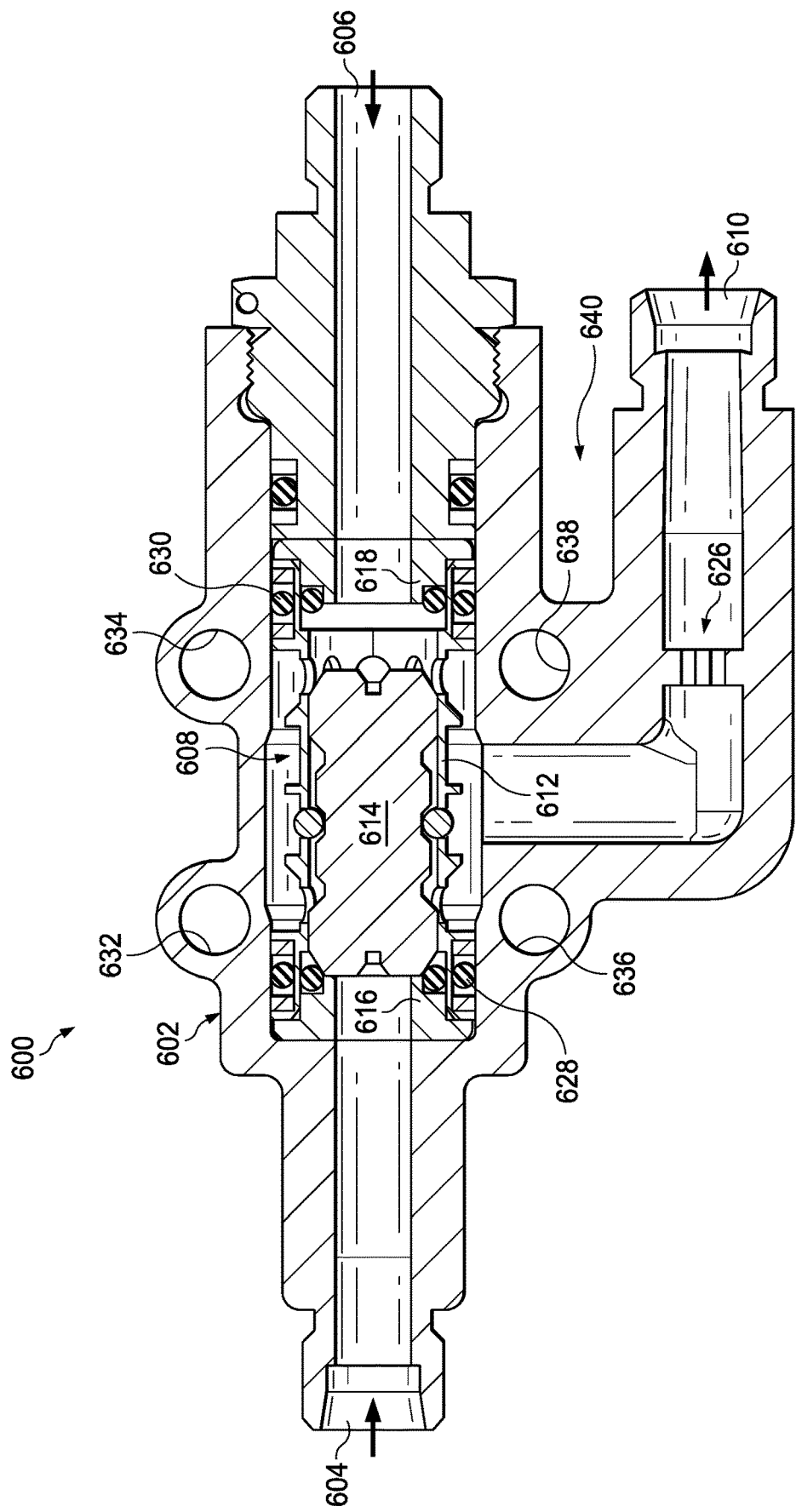
FIG. 6 shows a shuttle valve manufactured using additive manufacturing techniques, in accordance with one or more embodiments of the invention.

FIG. 6 shows a shuttle valve manufactured using additive manufacturing techniques, in accordance with one or more embodiments of the invention. The shuttle valve (600) shown in FIG. 6 is a variation of the shuttle valve (300) shown in FIG. 3, and represents substantial improvements over the prior art shuttle valve (500) shown in FIG. 5.

The shuttle valve (600) includes a housing (602), which forms a monocoque body that includes all regions of the shuttle valve (600) other than the spool (614). In other words, all of the components described with respect to FIG. 6 are part of a monocoque housing (602), except as noted. The various portions described below are considered regions that are integrated with the housing (602).

Thus, the shuttle valve (600) housing (602) includes a first inlet (604) and a second inlet (606) that allows fluid to flow into a manifold chamber (608). An outlet (610) allows fluid to flow out of the manifold chamber (608).

A sleeve (612) is disposed in the manifold chamber (608). A spool (614) slidably disposed inside the sleeve (612), and thus is not integrally formed with the housing (602). The housing (602) may also include a first retainer (616) and a second retainer (618). The first retainer (616) and the second retainer (618) may allow for metal-to-metal contact between the spool (614) and the retainers, when the housing (602) and the spool (614) are formed from metal.

The shuttle valve (600) may also include a strainer (626). The strainer (626) may be sized and dimensioned to eliminate particles or foreign object debris (FOD) from operating fluid entering the outlet (610).

Other optional features may also be present, such as first O-ring (628) and second O-ring (630). The O-rings may serve as back-up seals for the first retainer (616) and the second retainer (618), respectively. In another embodiment, mounting tabs may be integrally formed with the housing (602), such as first mounting tab (632), second mounting tab (634), third mounting tab (636), and fourth mounting tab (638). More or fewer mounting tabs may be present. Still other optional features may be present. Thus, the one or more embodiments are not necessarily limited to the examples shown in FIG. 6.

The shuttle valve (600) shown in FIG. 6 has many improved features relative to the prior art shuttle valve (500) shown in FIG. 5. For example, because the shuttle valve (600) is formed using additive manufacturing into a monocoque housing (602), there is no need to drill a plug through the housing into the chamber (608), opposite the outlet (610), as is required for the prior art shuttle valve (500) shown in FIG. 5. The plug shown in the prior art shuttle valve (500) of FIG. 5 was required to facilitate the drilling of a 90 degree flow path at the outlet (610), but with additive manufacturing the 90 degree flow path may be manufactured without having the plug that is required in the prior art shuttle valve (500) shown in FIG. 5. Additionally, with no plug, the chamber (608) has a smooth inner geometry, thereby improving fluid flow efficiency within the shuttle valve (600).

Additionally, the shuttle valve (600) is lighter than the prior art shuttle valve (500). The shuttle valve (600) has fewer components, and can be built with the cutout region (640) without cutting or wasting material. Lighter components are desirable in hydraulic systems, such as aircraft, where weight is an ever present issue directly related to fuel consumption, and hence operational cost of the aircraft.

Yet further, the shuttle valve (600) reduces the total number of components of the prior art shuttle valve (500) shown in FIG. 5. Upwards of 10 or more components in the prior art shuttle valve (500) may be reduced to a single housing (602). As a result, the speed, efficiency, and cost effectiveness of manufacturing of the shuttle valve (600) are all improved. Still further, the shuttle valve (600) will have an improved durability and operational efficiency, further reducing maintenance costs. Further yet, special operating skills are not required to produce the shuttle valve (600), because no drilling or machining operations are needed. Material waste is substantially reduced or eliminated, and the assembly process is simplified and made faster. Thus, the one or more embodiments represent a substantial improvement over the known art.

Figure 7:
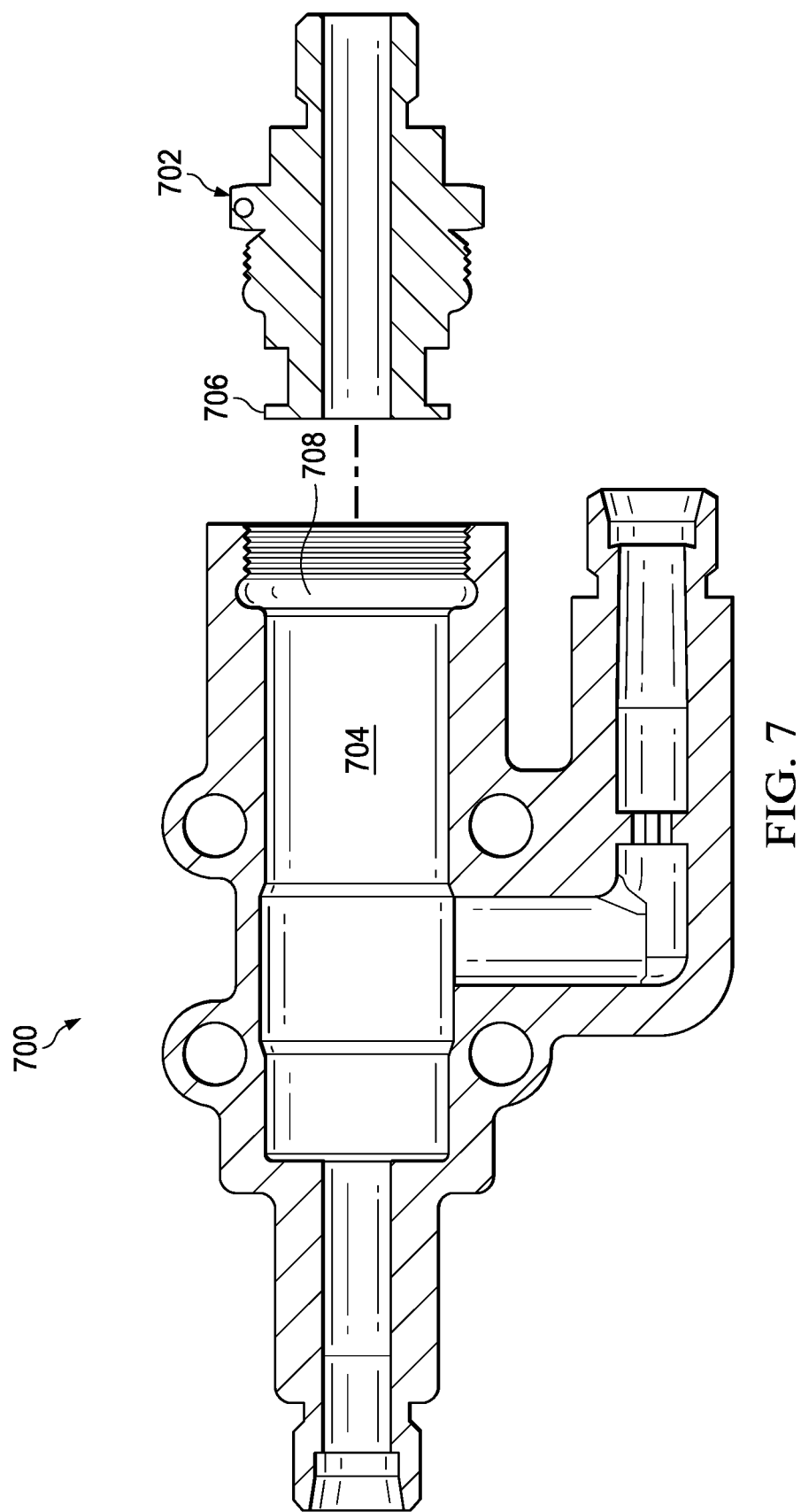
FIG. 7 shows an adapter for a shuttle valve manufactured using additive manufacturing techniques, in accordance with one or more embodiments of the invention.

FIG. 7 shows an adapter for a shuttle valve manufactured using additive manufacturing techniques, in accordance with one or more embodiments of the invention. The shuttle valve (700) shown in FIG. 7 is a variation of the shuttle valve (600) shown in FIG. 6 and the shuttle valve (300) shown in FIG. 3.

FIG. 7 shows that the shuttle valve (700) need not be a completely monocoque body. For engineering reasons, it may be desirable to form two or more components of the shuttle valve (700) using additive manufacturing, and then join those two parts together. Thus, for example, the second inlet (606) shown in FIG. 6 might be replaced by an adapter (702) that is then fitted into the manifold chamber (704). A retaining feature (706) of the adapter (702) may then be set into a groove (708) disposed in the wall of the manifold chamber (704). Thereafter, the shuttle valve (700) may operate as described above once a spool (not shown) is placed inside the manifold chamber (704).

While FIG. 6 and FIG. 7 shows a configuration of components, other configurations may be used without departing from the scope of the invention. For example, various components may be combined to create a single component, as in FIG. 6. As another example, the functionality performed by a single component may be performed by two or more components, as in FIG. 7.

Figure 8:
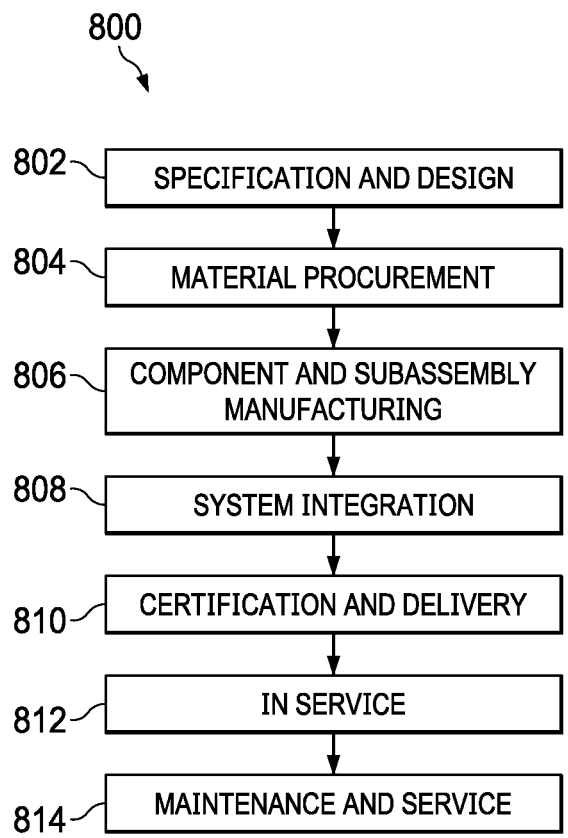
FIG. 8 shows a manufacturing and maintenance method, in accordance with one or more embodiments of the invention.
Figure 9:
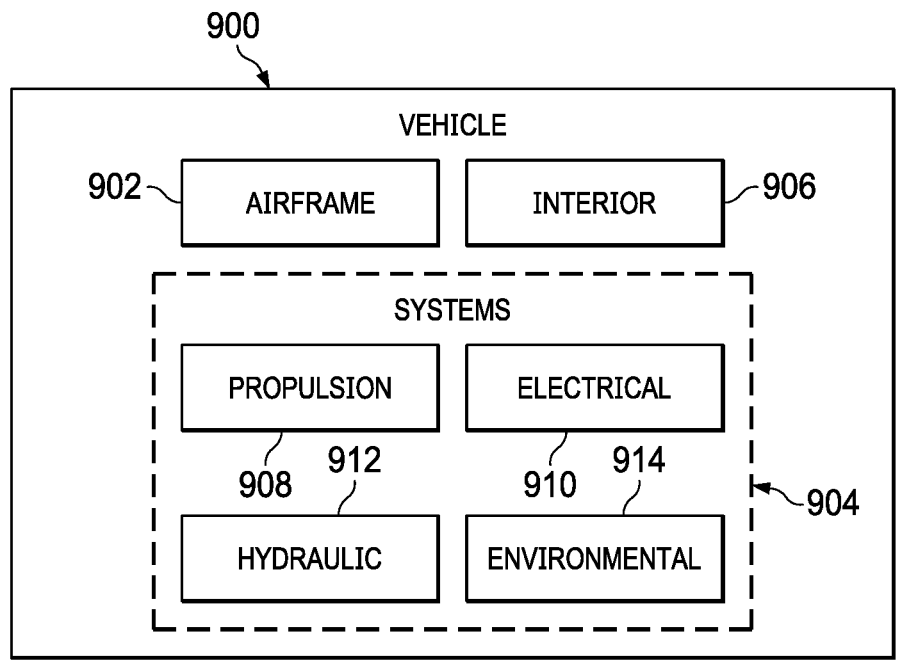
FIG. 9 shows an aircraft, in accordance with one or more embodiments of the invention.

FIG. 8 shows a flowchart of a method for manufacturing and maintenance, in a second position, in accordance with one or more embodiments of the invention. FIG. 9 shows a block diagram of an aircraft, in a second position, in accordance with one or more embodiments of the invention.

Turning to FIG. 8, during pre-production, the exemplary aircraft manufacturing and service method (800) may include a specification and design (802) of the aircraft (900) in FIG. 9 and a material procurement (804) for the aircraft (900). During production, the component and subassembly manufacturing (806) and system integration (808) of the aircraft (900) in FIG. 9 takes place. Thereafter, the aircraft (900) in FIG. 9 may go through certification and delivery (810) in order to be placed in service (812). While in service by a customer, the aircraft (900) in FIG. 9 is scheduled for routine maintenance and service (814), which may include modification, reconfiguration, refurbishment, and other maintenance or service.

Each of the processes of the aircraft manufacturing and service method (800) may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

With reference now to FIG. 9, an illustration of an aircraft (900) is depicted in which an advantageous embodiment may be implemented. In this example, the aircraft (900) is produced by the aircraft manufacturing and service method (800) in FIG. 8. The aircraft (900) may include airframe (902) with systems (904) and an interior (906). Examples of systems (904) include one or more of a propulsion system (908), an electrical system (910), a hydraulic system (912), and an environmental system (914). Any number of other systems may be included.

Although an aerospace example is shown, different advantageous embodiments may be applied to other industries, such as the automotive industry. Thus, for example, the aircraft (900) may be replaced by an automobile or other vehicle or object in one or more embodiments.

The apparatus and methods embodied herein may be employed during any one or more of the stages of the aircraft manufacturing and service method (800) in FIG. 8. For example, components or subassemblies produced in the component and subassembly manufacturing (806) in FIG. 8 may be fabricated or manufactured in a manner similar to components or subassemblies produced while the aircraft (900) is in service (812) in FIG. 8.

Also, one or more apparatus embodiments, method embodiments, or a combination thereof may be utilized during production stages, such as the component and sub-assembly manufacturing (806) and system integration (808) in FIG. 8, for example, by substantially expediting the assembly of or reducing the cost of the aircraft (900). Similarly, one or more of apparatus embodiments, method embodiments, or a combination thereof may be utilized while the aircraft (900) is in service (812) or during maintenance and service (814) in FIG. 8.

For example, one or more of the advantageous embodiments may be applied during component and subassembly manufacturing (806) to rework inconsistencies that may be found in composite structures. As yet another example, one or more advantageous embodiments may be implemented during maintenance and service (814) to remove or mitigate inconsistencies that may be identified. Thus, the one or more embodiments described with respect to FIG. 1 through FIG. 9 may be implemented during component and subassembly manufacturing (806) and/or during maintenance and service (814) to remove or mitigate inconsistencies that may be identified.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of manufacturing, comprising:
    forming an integrally formed monocoque body using an additive manufacturing process, wherein the integrally formed monocoque body comprises:
        a first inlet having first coupling region in communication with a first fluid line, wherein the first fluid line comprises a first inner radius that is substantially uniform along a first length of the first inlet;
        a second inlet having a second coupling region in communication with a second fluid line, wherein the second fluid line comprises a second inner radius that is substantially uniform along a second length of the second inlet;
        a manifold chamber in communication with the first fluid line, opposite the first coupling region, and in communication with the second fluid line, opposite the second coupling region;
        an outlet having a third coupling region in communication with a third fluid line, wherein the third fluid line is in communication with the manifold chamber between the first inlet and the second inlet, and wherein the third fluid line comprises a third inner radius that is substantially uniform along a third length of the third fluid line, the outlet having a contiguous, 90 degree flow path from the manifold chamber; and
        a strainer integrally formed with the outlet in the third fluid line;
    inserting a sleeve-spool assembly in the manifold chamber, the sleeve-spool assembly comprising at least a spool; and
    inserting a retention feature in the manifold chamber, the retention feature configured to retain the spool at one of a first position and a second position, wherein at the first position a first end of the spool blocks the first inlet, wherein at the second position a second end of the spool blocks the second inlet, and wherein at either the first position or the second position the outlet remains open.

2. The method of claim 1, further comprising:
    inserting a first spool retainer at a first intersection between the first fluid line and the manifold chamber, the first spool retainer comprising a fourth fluid line in communication with the first fluid line and having a fourth inner radius substantially uniform to the first inner radius; and
    inserting a second spool retainer at a second intersection between the second fluid line and the manifold chamber, the second spool retainer comprising a fifth fluid line in communication with the second fluid line and having a fifth inner radius substantially uniform to the second inner radius.

3. The method of claim 1, further comprising:
    inserting a sleeve into the manifold chamber, wherein the spool is inserted into the sleeve prior to being inserted into the manifold chamber, and wherein the spool slides longitudinally within the sleeve between the first position and the second position.

4. The method of claim 1, wherein the integrally formed monocoque body is formed such that a first cross-section of the first inlet, a second cross section of the second inlet, and a third cross section of the outlet are manufactured to be substantially equivalent.

5. The method of claim 1, wherein the integrally formed monocoque body is formed such that:
    the outlet extends radially from the manifold chamber a first distance, and the third fluid line has a bend at the first distance before terminating at the third coupling region.

6. The method of claim 5, wherein the strainer is integrally formed with the outlet in the third fluid line after the bend.

7. The method of claim 5, wherein the integrally formed monocoque body is formed such that the third fluid line bends such that a terminal region of the third fluid line is substantially parallel to the second fluid line of the second inlet.

8. The method of claim 7, further comprising:
    further forming the integrally formed monocoque body such that a cutout region is disposed between the outlet and the second inlet.

* * * * *